UNITED STATES PATENT OFFICE.

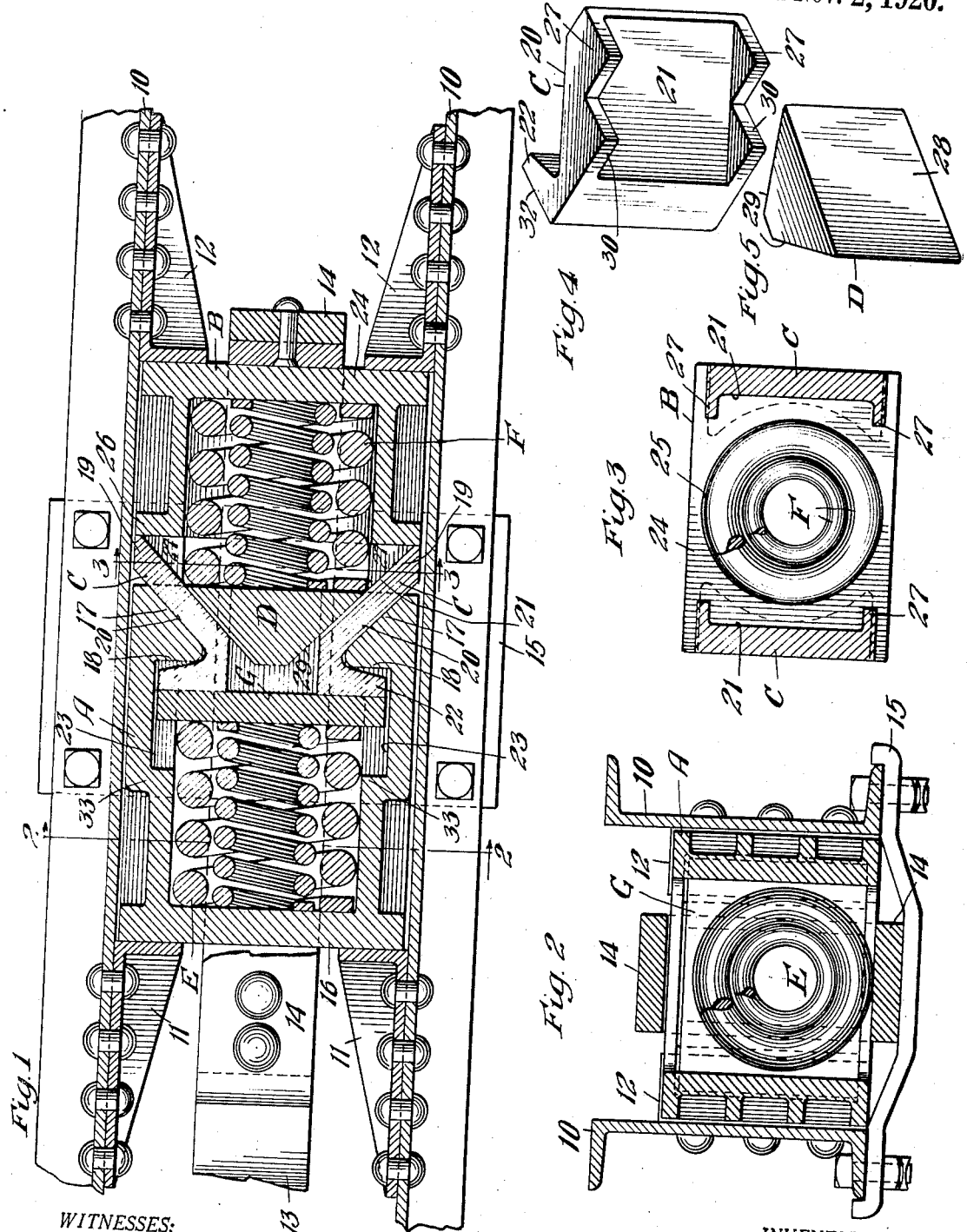

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,357,803.

Specification of Letters Patent.   Patented Nov. 2, 1920.

Application filed April 11, 1919.   Serial No. 289,193.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide an efficient friction shock absorbing mechanism especially adapted for railway draft riggings and wherein high capacity and large friction wearing areas are obtained.

In the drawing forming a part of this specification, Figure 1 is a horizontal, longitudinal, sectional view of a portion of a railway draft rigging showing my improvements in connection therewith. Fig. 2 is a vertical, transverse, sectional view taken on the line 2—2 of Fig. 1. Fig. 3 is a vertical, transverse, sectional view taken through the shock absorbing mechanism proper substantially on the line 3—3 of Fig. 1. Figs. 4 and 5 are detail perspectives of one of the friction shoes and the wedge employed with my improvements, respectively.

In said drawing, 10—10 denote channel-shaped center or draft sills to the inner faces of which are secured front stops 11 and rear stops 12 spaced the standard distance apart of 24-5/8". A portion of the draw bar is indicated at 13, the same being operatively associated with the shock absorbing mechanism proper by a yoke strap 14 of usual form. The parts of the mechanism and yoke may be supported by any suitable means such as the detachable saddle plate 15.

The improved shock absorbing mechanism proper, as shown, comprises a friction shell A, a follower-acting member B, a pair of friction shoes C—C, a wedge D, tandem arranged springs E and F, and a spring follower G.

The shell A is of substantially rectangular form in cross section and is provided at one end with a transverse wall 16 which acts as the front follower. Near its inner end, the shell A is provided with an opposed pair of inclined friction surfaces 17—17, the same being so formed as to provide forwardly facing interior shoulders 18—18. The shell A is open at top and bottom as indicated in Fig. 2 so that the front spring E may be inserted transversely of the shell after the other parts are in position.

Each of the shoes C comprises a friction plate portion 19 having an outer friction face 20 coöperable with the friction surface 17 of the shell and an inner preferably parallel friction surface 21. At its inner or forward end, each shoe C is provided with an outwardly or laterally extended flange 22 adapted to engage behind the corresponding adjacent shoulder 18 of the shell, as clearly shown in Fig. 1. To accommodate the outwardly extended flanges 22 and also the follower G which bears directly thereagainst, the shell A is widened immediately forward of the friction surfaces 17—17 so as to provide longitudinally extending pockets 23—23.

The follower-acting member B, as shown, has an integral rear wall 24 which acts as the rear follower proper, said member B being extended forwardly with a substantially circular section as indicated at 25 in Fig. 3 to form a pocket for the rear spring F. At its forward end, the member B is laterally flanged as indicated at 26 so as to form in effect a follower, the same engaging the rear ends of the shoes C—C. In order to provide sufficient bearing surface on the rear ends of the shoes C, the same are formed with upper and lower horizontally extending flanges 27—27 against which the member B bears.

The spring F normally extends beyond the front end of the member B and directly engages the rear face 28 of the triangular-shaped wedge D. The latter has side wedge faces 29—29 which coöperate with the friction surfaces 21—21 of the shoes C. To assist in centering the wedge D, the shoes C may be provided with additional upper and lower horizontally extending substantially triangular-shaped flanges 30—30 between which the wedge D fits and is properly supported.

The operation is as follows: Under draft it is evident that the member B will be pulled forwardly by the yoke and draw bar. As said member B moves forwardly, it will directly force the shoes C forwardly at a similar rate. The shoes C in addition to their forward movement above mentioned will also be moved inwardly toward each other as they slide over the friction surfaces 17 of the shell. During this action it is evident that the wedge D will remain stationary, that is, will not move longitudinally relatively to the shell A since the inner and outer friction surfaces of the shoes are parallel. As the member B moves forwardly and the wedge D remains stationary as above explained, the spring F will be compressed so that the friction generated is gradually augmented as the member B approaches the shell A. As the shoes C are moved forwardly in the manner specified, it is evident that they will be directly resisted by the spring E which acts through the spring follower G. In addition to the resistance offered by the spring E, friction will be generated between the forward transverse surfaces 32 of the shoes and the spring follower G. Overcompression of the springs is prevented by the member B coming into contact with the shell A and also by having the spring follower G simultaneously engage the shoulders 33 at the forward ends of the recesses 23. The release will be understood without detailed description as will also the action under buff, which is the same except that the rear member B is held stationary whereas the shell A is moved rearwardly toward the same.

The parts are so designed that I am enabled to use two Class "G" springs and all the parts are accommodated in the standard friction gear spacing between stops. Furthermore, the shoes and wedge and the shell are of such form that they may be manufactured at comparatively small expense in the form of ordinary castings without the necessity for obtaining the extreme accuracy now required in certain types of friction gears.

I claim:

1. In a friction shock absorbing mechanism, the combination with a shell having friction surfaces, of friction shoes coöperable with and slidable relatively to the friction surfaces of the shell; a wedge co-acting with said shoes and relatively immovable with respect to the shell, a follower-acting member movable relatively to the shell, a spring interposed between said member and wedge and thereby adapted to increase proportionally the frictional resistance upon relative approach of the shell and member, and a second spring for resisting relative movement between the shoes and shell.

2. In a friction shock absorbing mechanism, the combination with a friction shell having opposed inclined friction surfaces, of friction shoes having substantially parallel inner and outer friction surfaces, the outer surfaces of the shoes coöperating with the friction surfaces of the shell, a wedge coöperable with the inner surfaces of the shoes, a follower-acting member adapted to directly move said shoes relatively to the shell, and a spring interposed between said member and the wedge, said spring being compressed an amount corresponding to the relative approach between said member and shell.

3. In a friction shock absorbing mechanism, the combination with a friction shell and friction shoes coöperable therewith, of means for directly moving said shoes relatively to the shell and normally in engagement with said shoes, a spring to directly resist relative movement between said shoes and shell, and friction pressure-creating means interposed between said first named means and the shoes, said friction pressure-creating means including a spring and a wedge, the latter being held substantially immovable with respect to the shell during actuation of the mechanism.

4. In a friction shock absorbing mechanism, the combination with two end followers, of tandem arranged springs, one in engagement with each follower, a friction shell disposed intermediately of said followers and always at a fixed distance with respect to one of them, friction shoes coöperable with said shell and movable longitudinally in unison with the other of said followers, and a wedge relatively immovable longitudinally of the shell directly engaging and coöperating with said shoes.

5. In a friction shock absorbing mechanism, the combination with a casting having a follower-acting wall at one end and a friction shell at the other end, the shell having converging friction surfaces, of a spring mounted within said casting, friction shoes coöperable with said converging friction surfaces of the shell, said spring being adapted to directly resist relative movement between said shoes and shell, a follower-acting member, means interposed between said follower-acting member and the shoes for directly actuating the latter relatively to the shell, and variable friction-creating means, including a wedge relatively stationary with respect to the shell, interposed between said follower-acting member and the shoes, said variable friction creating means acting with a strength inversely proportional to the relative distance between the follower-acting member and the shell.

6. In a friction shock absorbing mechanism, the combination with a friction shell having oppositely inclined friction surfaces, of a spring within said shell, friction shoes coöperable with said shell and having each inner and outer friction surfaces parallelly arranged, the outer friction surfaces of the shoes coöperating with those of the shell, a wedge interposed between said shoes and coöperating with the inner friction surfaces thereof, a follower-acting member, a spring interposed between said member and said wedge, and means for directly actuating said shoes from said follower-acting member.

7. In a friction shock absorbing mechanism, the combination with a friction shell having oppositely arranged inclined friction surfaces, of a plurality of friction shoes, one for each of said inclined friction surfaces of the shell, each shoe having parallel inner and outer friction surfaces, the outer friction surfaces of the shoes coöperating with the respective inclined friction surfaces of the shell, spring means for resisting relative movement between the shoes and shell, a wedge common to said shoes and having wedge surfaces coöperable with the inner friction surfaces of the shoes, said wedge being formed separately from the shell and loose with respect thereto, said wedge being prevented from relative movement lengthwise of the shell, a follower movable relatively to the shell, and a spring interposed between the follower and wedge.

In witness that I claim the foregoing I have hereunto subscribed my name this 22d day of Feb., 1919.

JOHN F. O'CONNOR.

Witness:
CARRIE GAILING.